(12) United States Patent
Oikawa

(10) Patent No.: US 7,474,352 B2
(45) Date of Patent: Jan. 6, 2009

(54) FOCUS DETECTION BASED ON AN OPENING PUPIL RATIO

(75) Inventor: Makoto Oikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 10/733,424

(22) Filed: Dec. 10, 2003

(65) Prior Publication Data

US 2004/0179128 A1     Sep. 16, 2004

(30) Foreign Application Priority Data

Dec. 11, 2002    (JP)    ............................. 2002-359474

(51) Int. Cl.
*G03B 13/00*    (2006.01)
*H04N 5/232*    (2006.01)

(52) U.S. Cl. .................. 348/349; 348/208.12; 348/326; 348/345

(58) Field of Classification Search ............ 348/208.12, 348/326, 345, 349
See application file for complete search history.

(56) References Cited

U.S. PATENT DOCUMENTS

| | | | | |
|---|---|---|---|---|
| 4,346,970 | A * | 8/1982 | Kawabata et al. ............. | 396/92 |
| 4,523,829 | A * | 6/1985 | Eguchi et al. ................ | 396/123 |
| 4,647,174 | A * | 3/1987 | Tsunekawa et al. .......... | 396/128 |
| 4,734,571 | A * | 3/1988 | Hamada et al. ........... | 250/201.8 |
| 5,202,555 | A * | 4/1993 | Ishida et al. ............. | 250/201.8 |
| 5,349,409 | A * | 9/1994 | Kawasaki et al. ............. | 396/87 |
| 5,825,016 | A * | 10/1998 | Nagahata et al. ......... | 250/201.8 |
| 5,995,144 | A * | 11/1999 | Sasakura .................... | 348/350 |
| 6,192,163 | B1 * | 2/2001 | Murayama .................. | 382/274 |
| 6,359,704 | B1 * | 3/2002 | Horaguchi ................. | 358/474 |
| 7,102,675 | B1 * | 9/2006 | Tokunaga .................... | 348/297 |
| 2001/0033701 | A1 * | 10/2001 | Okisu et al. ................. | 382/284 |

(Continued)

FOREIGN PATENT DOCUMENTS

JP    58-024105 A    2/1983

(Continued)

*Primary Examiner*—David L Ometz
*Assistant Examiner*—Usman Khan
(74) *Attorney, Agent, or Firm*—Morgan & Finnegan, LLP

(57) ABSTRACT

It is an object of this invention to efficiently correct, with a small calculation amount, the unbalance caused between the first and second image signals when limitation is imposed by vignetting in a photographing optical system. In order to achieve this object, there is provided a focus detection device comprising a solid-state image sensing device including a first photoelectric conversion element array which photoelectrically converts a first light beam passing through a first area of an exit pupil of a photographing optical system, and a second photoelectric conversion element array which photoelectrically converts a second light beam passing through a second area of the exit pupil which is different from the first area, and a computing unit for detecting a focus state of the photographing optical system by computing a correlation between a first image signal which is an image signal from the first photoelectric conversion element array and a second image signal which is an image signal from the second photoelectric conversion element array in accordance with the position of a focus detection area in an image sensing frame on the basis of the ratio between a shift amount t of a focus detection opening pupil, formed when limitation is imposed by an exit window of the photographing optical system, with respect to an optical axis, and a width T of the focus detection opening pupil.

4 Claims, 18 Drawing Sheets

U.S. PATENT DOCUMENTS

2002/0101531 A1 * 8/2002 Kaneda ..................... 348/347

FOREIGN PATENT DOCUMENTS

| JP | 60-086517 | 5/1985 |
| JP | 7-62731 B2 | 7/1995 |
| JP | 2000324505 A | 11/2000 |
| JP | 2001124984 A | 5/2001 |

* cited by examiner

— A IMAGE SIGNAL
---- B IMAGE SIGNAL

F I G. 14
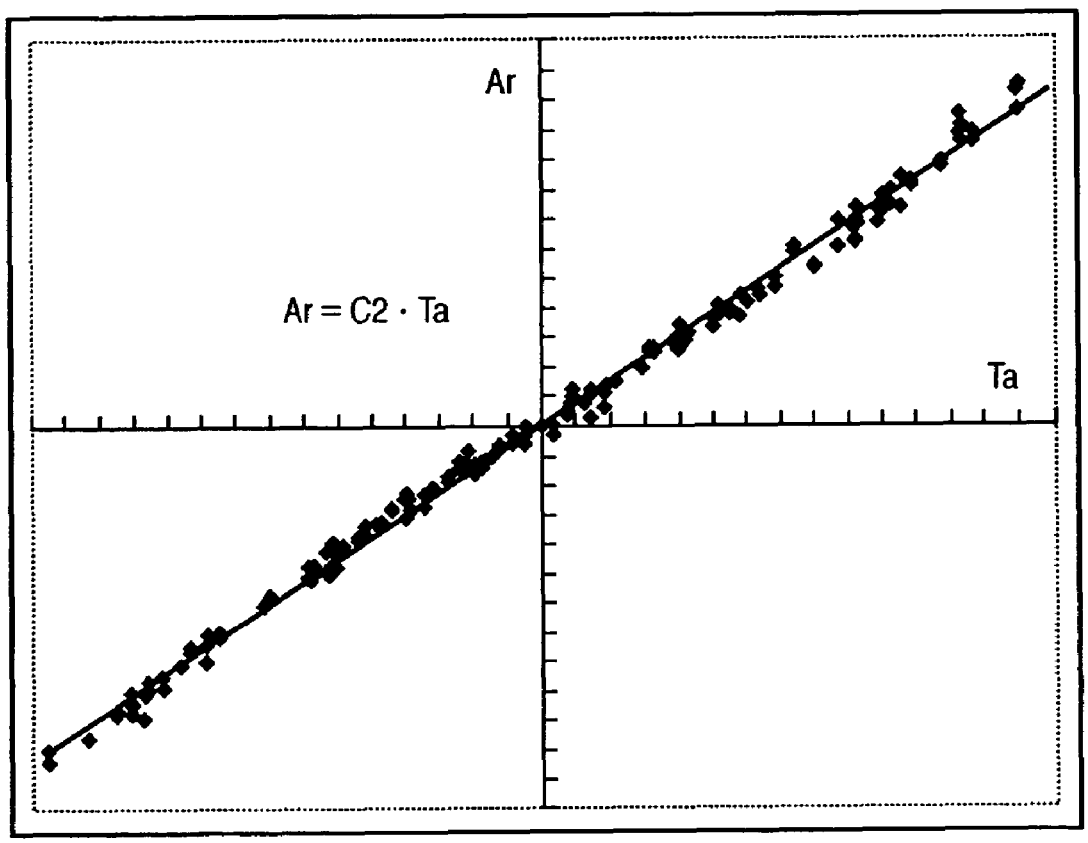

FOCUS DETECTION BASED ON AN OPENING PUPIL RATIO

FIELD OF THE INVENTION

The present invention relates to a technique of detecting the imaging state of a photographing lens on the basis of the relative positional relationship between two object images formed by light beams passing through different pupil areas of the photographing lens.

BACKGROUND OF THE INVENTION

There are several methods as focus detection schemes for cameras. The device disclosed in Japanese Patent Laid-Open No. 58-24105 is designed to perform focus detection based on a pupil division scheme using a two-dimensional light-receiving sensor having a microlens formed at each pixel on the sensor.

FIG. 2 is a view for explaining the principle of the method of performing focus detection based on the pupil division scheme proposed in the above reference.

An image sensor 10 is placed on a prospective imaging plane of a photographing lens 5. One pixel of the image sensor 10 is constituted by two photoelectric conversion elements 13α and 13β. The photoelectric conversion elements 13α and 13β are designed to receive light beams transmitted through different positions on the pupil of the photographing lens 5 through a microlens 11 formed on the photographing lens side of each photoelectric conversion element.

In this case, the photoelectric conversion element 13α mainly receives a light beam transmitted through the upper side of the photographing lens 5 in FIG. 2, whereas the photoelectric conversion element 13β mainly receives a light beam transmitted through the lower side of the pupil of the photographing lens 5 in FIG. 2. In focus detection, outputs from the respective photoelectric conversion elements are read, and an image signal based on light beams transmitted through different pupil positions on the photographing lens is generated from outputs from a plurality of pixels.

The present applicant disclosed a focus detection device capable of performing focus detection based on the pupil division scheme in Japanese Patent Laid-Open No. 2001-124984. The focus detection device in this reference has a pair of photoelectric conversion elements provided for each of two-dimensionally arranged microlens arrays, and divides the pupil by projecting the photoelectric conversion elements on the pupil of a photographing optical system through the microlenses. The focus state of the photographing lens is detected on the basis of the phase difference between the first and second image signals (to be referred to as the A image signal and B image signal hereinafter, respectively) obtained from outputs from the photoelectric conversion element array corresponding to two light beams passing through different portions of the pupil of the photographing optical system. In this case, the phase difference indicates the relative positional relationship between the A and B image signals.

A focus detection device is also disclosed in Japanese Patent Publication No. 7-62731, which realizes accurate focus detection by switching the F-numbers of a focus detection optical system upon detection of an unbalanced state of the A and b image signals obtained from outputs from a photoelectric conversion element array. This focus detection device has two focus detection units with different F-numbers. When the coincidence between the A and B image signals is high, focus detection is performed by the focus detection unit with the smaller F-number that allows the reception of many light beams. When the coincidence between the A and B image signals is low, focus detection is performed by using the focus detection unit with the larger F-number that minimizes vignetting of a focus detection light beam.

An image capturing device designed to perform gain control on a pixel signal on the basis of lens information and a position on an image sensing plane is also disclosed in Japanese Patent Laid-Open No. 2000-324505. Letting L be the distance from the center of the image sensing plane to a pixel, a gain control amount for the pixel at an arbitrary position is calculated by a polynomial for L. In this case, the coefficients of the polynomial are determined on the basis of a data table stored in correspondence with lens information including the lens exit pupil position.

In the focus detection device disclosed in Japanese Patent Publication No. 7-62731, in order to detect an unbalanced state of the A and B image signals obtained from outputs from photoelectric conversion cells, correlation computation processing must be performed once. For this reason, a computer with a high processing speed is mounted in the focus detection device to result in an increase in cost. Alternatively, a computer with a low processing speed is mounted in the device to result in a failure to realize high-speed focus detection. Furthermore, depending on a focus detection area, focus detection cannot be performed by using light beams with a small F-number.

In the image capturing device disclosed in Japanese Patent Laid-Open No. 2000-324505, letting L be the distance from the image sensing plane center to a pixel, a gain control amount on the pixel at an arbitrary position is calculated by a polynomial for L. Assume that this technique is applied to the focus detection device disclosed in Japanese Patent Laid-Open No. 2001-124984, i.e., gain control is performed for each of the first and second image signals according to a polynomial for L. In this case, if the gain control amount to be obtained is expressed by a polynomial for L, the degree of the polynomial increases. As a consequence, the calculation amount increases to result in an increase in computation load. For this reason, a computer with a high processing speed is mounted in the focus detection device to result in an increase in cost. Alternatively, a computer with a low processing speed is mounted in the device to result in a failure to realize high-speed focus detection.

SUMMARY OF THE INVENTION

The present invention has therefore been made in consideration of the above problems, and has as its object to efficiently correct, with a small calculation amount, an unbalance caused between the first and second image signals when limitation is imposed by vignetting in a photographing optical system.

It is another object of the present invention to prevent the F-number for light beams used for focus detection from being limited by a focus detection area.

In order to solve the above problems and achieve the above objects, according to the first aspect of the present invention, there is provided a focus detection device comprising a solid-state image sensing device including a first photoelectric conversion element array which photoelectrically converts a first light beam passing through a first area of an exit pupil of a photographing optical system, and a second photoelectric conversion element array which photoelectrically converts a second light beam passing through a second area of the exit pupil which is different from the first area, and a computing device which detects a focus state of the photographing optical system by computing a correlation between a first image signal which is an image signal from the first photoelectric conversion element array and a second image signal which is an image signal from the second photoelectric conversion element array in accordance with a position of a focus detection area in an image sensing frame on the basis of a ratio between a shift amount of a focus detection opening pupil, formed when limitation is imposed by an exit window of the photographing optical system, with respect to an optical axis, and a width of the focus detection opening pupil.

According to the second aspect of the present invention, there is provided a focus detection method wherein a first light beam passing through a first area of an exit pupil of a photographing optical system is photoelectrically converted by a first photoelectric conversion element array, a second light beam passing through a second area of the exit pupil which is different from the first area is photoelectrically converted by a second photoelectric conversion element array, and a focus state of the photographing optical system is detected by computing a correlation between a first image signal which is an image signal from the first photoelectric conversion element array and a second image signal which is an image signal from the second photoelectric conversion element array in accordance with a position of a focus detection area in an image sensing frame on the basis of a ratio between a shift amount of a focus detection opening pupil, formed when limitation is imposed by an exit window of the photographing optical system, with respect to an optical axis, and a width of the focus detection opening pupil.

According to the third aspect of the present invention, there is provided a program causing a computer to execute the above focus detection method.

According to the fourth aspect of the present invention, there is provided a storage medium computer-readably storing the above program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a graph showing the relationship between the parameter Ta and the A image signal output Ar;

DETAILED DESCRIPTION OF THE PREFERRED EMBODIMENTS

The preferred embodiments of the present invention will be described in detail below with reference to the accompanying drawings.

Figure 1:
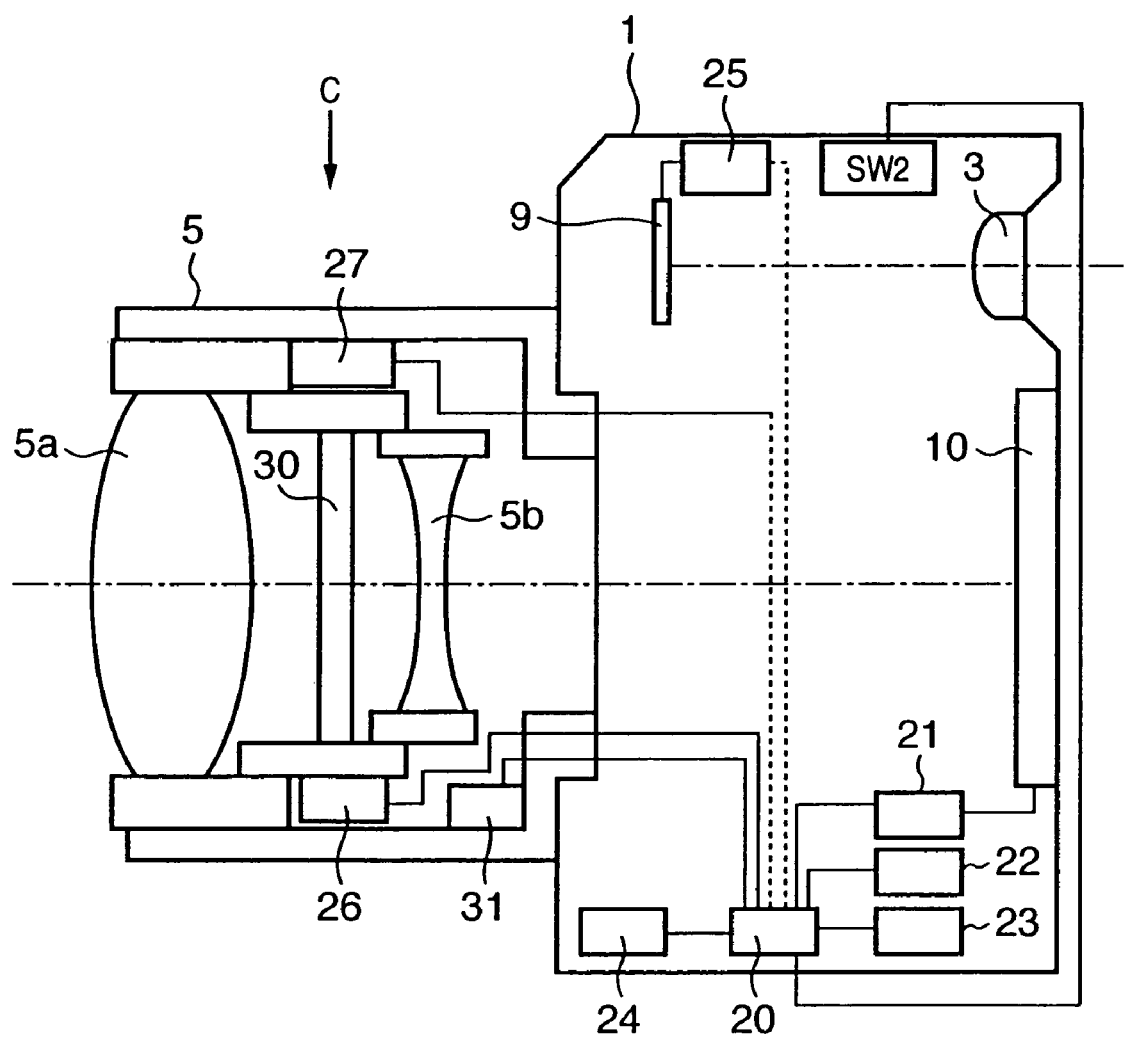
FIG. 1 is a view showing the arrangement of a camera and lens according to an embodiment of the present invention.
Figure 2:
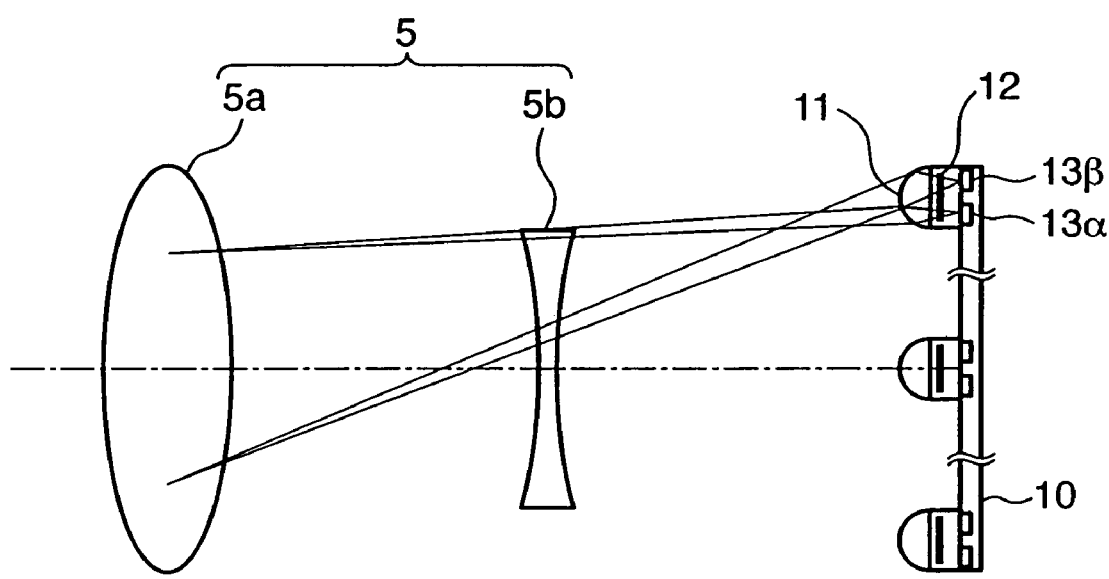
FIG. 2 is a view showing the relationship between the arrangement of an image sensor and a photographing lens.
Figure 15:
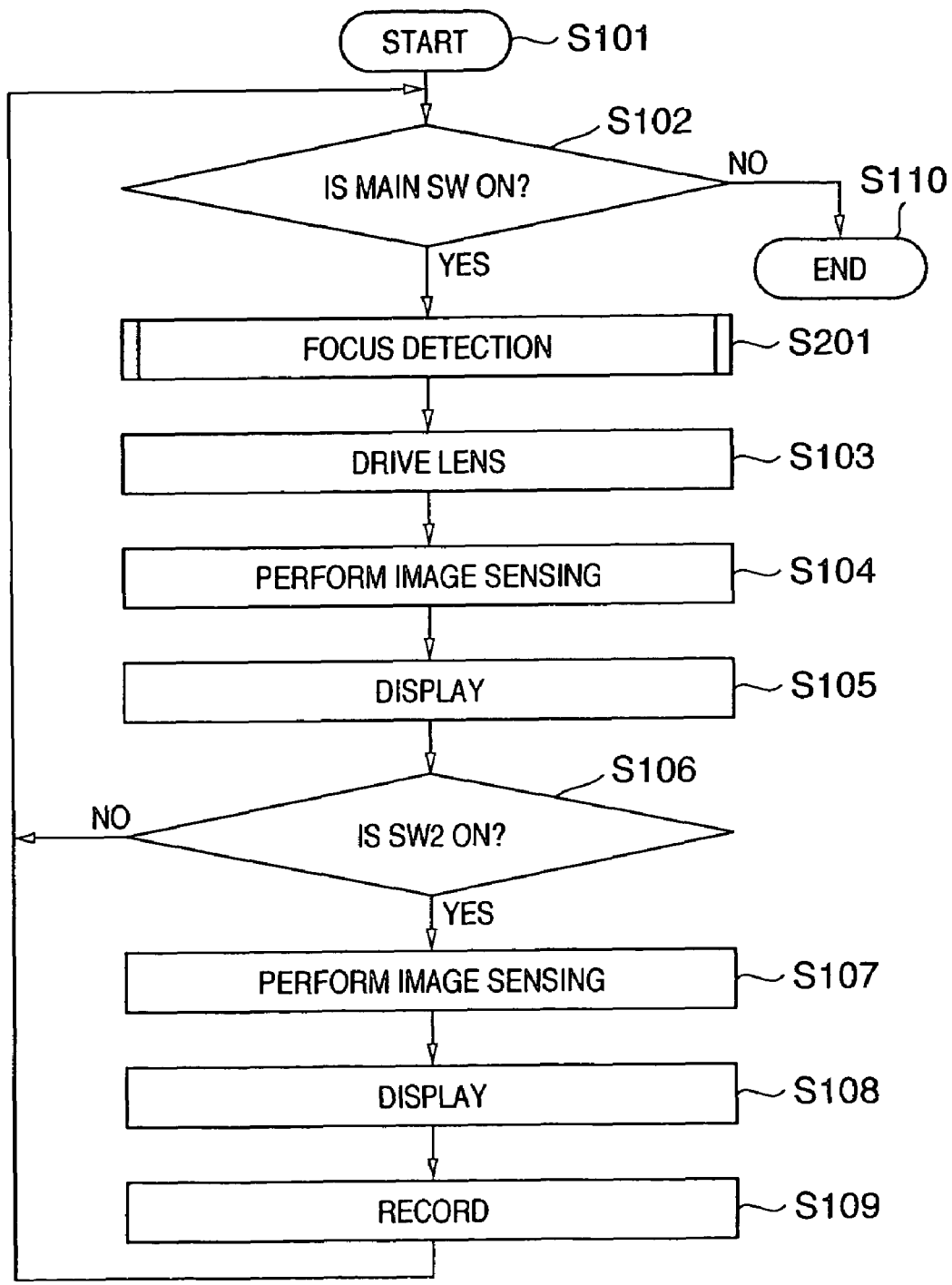
FIG. 15 is a flow chart for explaining the operation of the camera.
Figure 16:
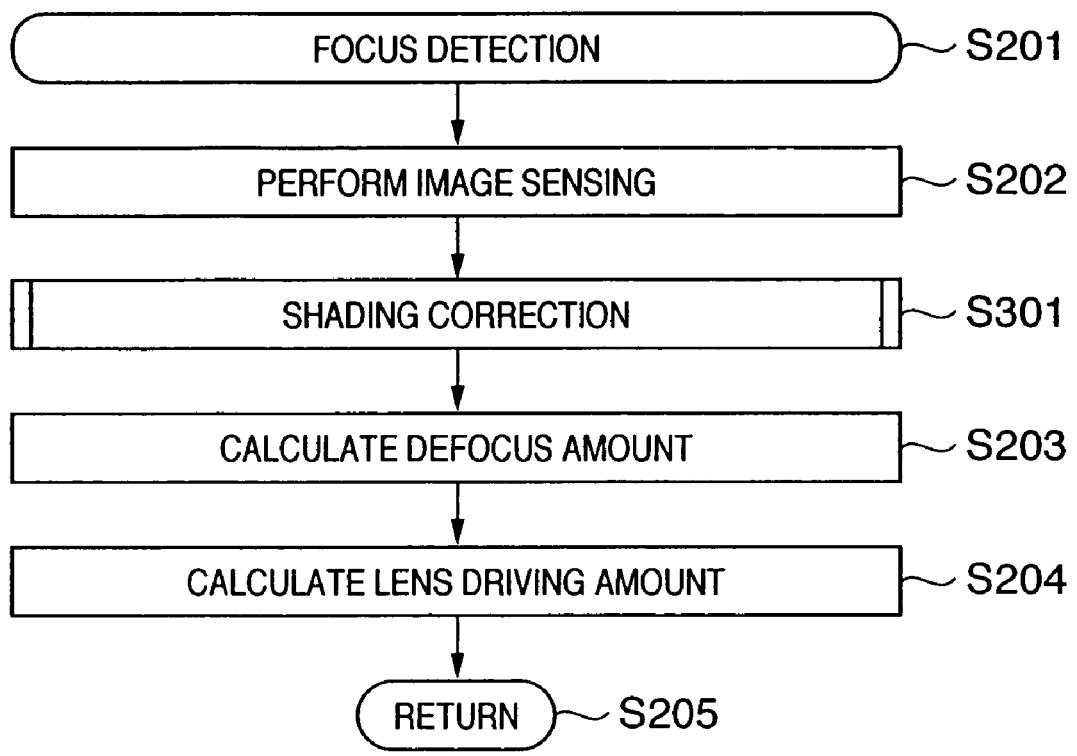
FIG. 16 is a flow chart for explaining operation in a focus detection subroutine.
Figure 17:
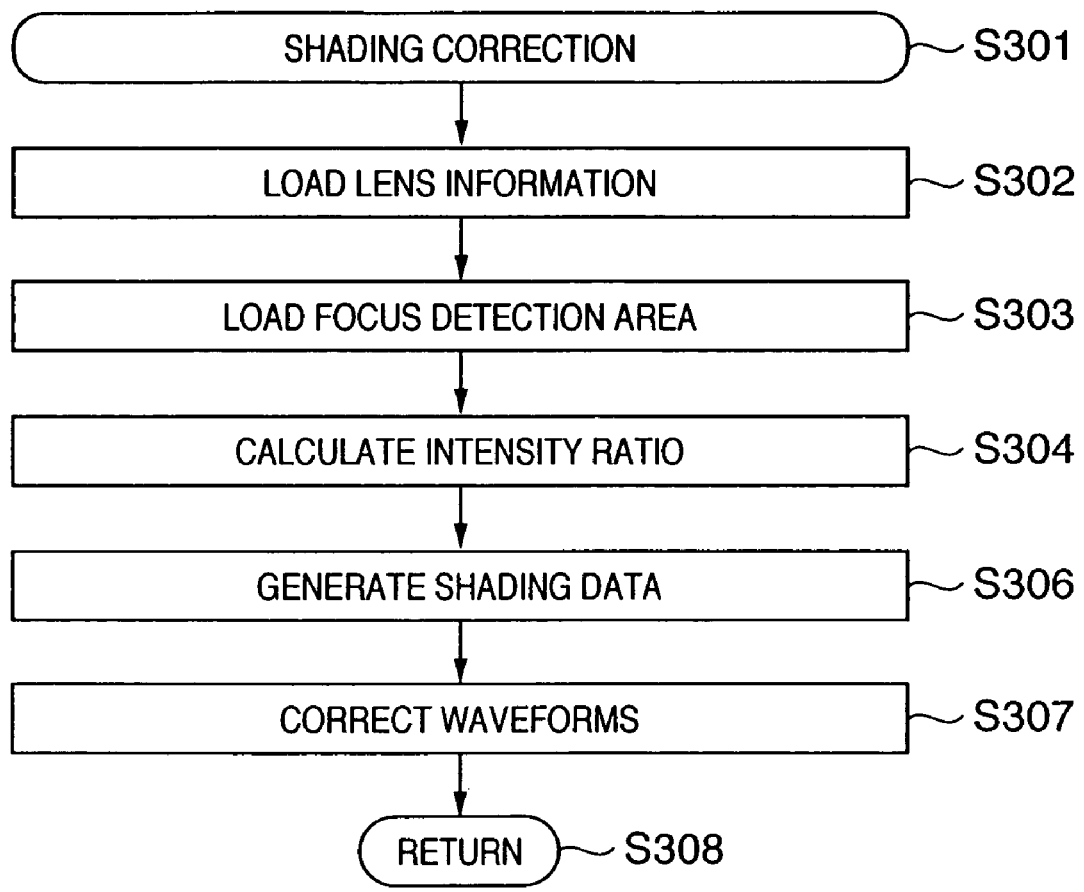
FIG. 17 is a flow chart for explaining operation in a shading correction subroutine in the first embodiment.
Figure 18:
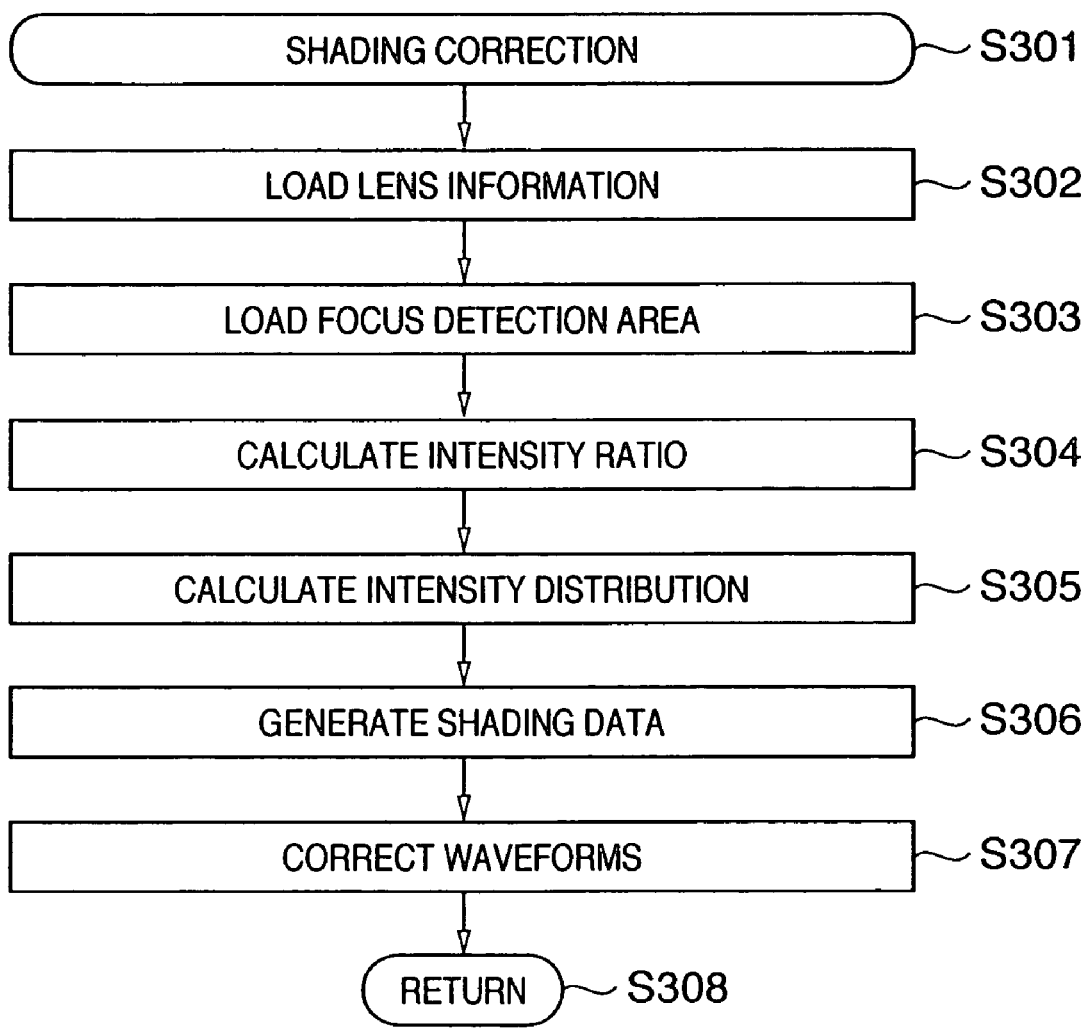
FIG. 18 is a flow chart for explaining operation in a shading correction subroutine in the second embodiment.

FIG. 1 is a view showing the arrangement of a digital still camera having a focus detection device. FIG. 2 is a view showing the relationship between the arrangement of an image sensor and a photographing lens in an embodiment. FIG. 15 is a flow chart for explaining the operation of the digital still camera. FIG. 16 is a flow chart for explaining operation in a focus detection subroutine. FIG. 17 is a flow chart for explaining operation in a shading correction subroutine in the first embodiment. FIG. 18 is a flow chart for explaining operation in a shading correction subroutine in the second embodiment.

Referring to FIG. 1, reference numeral 1 denotes a digital still camera body; and 10, an image sensing device (to be referred to as an image sensor hereinafter) which is placed at a prospective imaging plane of a photographing lens 5. The digital still camera body 1 includes a CPU 20 which controls the overall camera, an image sensor control circuit 21 which performs driving control of the image sensor 10, an image processing circuit 24 which performs image processing of the image signal obtained by imaging by the image sensor 10, a liquid crystal display device 9 for displaying a sensed image, a liquid crystal display device driving circuit 25 which drives the liquid crystal display device, an eyepiece 3 for the observation of the object image displayed on the liquid crystal display device 9, a memory circuit 22 on which the image sensed by the image sensor 10 is recorded, an interface circuit 23 for outputting the image subjected to image processing in the image processing circuit 24 to the outside of the camera, and an operation switch SW2 for allowing a photographer to record a sensed image.

The focus detection device of this embodiment is comprised of the CPU 20 and image sensor 10.

The photographing lens 5 is an interchangeable lens which is mounted on the digital still camera body 1. For the sake of convenience, the photographing lens 5 shown in FIG. 1 has two lenses 5a and 5b, but is actually constituted by many lenses. The photographing lens 5 is adjusted to an in-focus state by a photographing lens driving mechanism 26 on the basis of the lens driving amount sent from the CPU 20. Reference numeral 30 denotes a stop device which is stopped down to a predetermined aperture value by a stop driving mechanism 27; and 31, a photographing lens memory circuit on which information unique to the photographing lens is recorded. The photographing lens driving mechanism 26, stop driving mechanism 27, and photographing lens memory circuit 31 can communicate with the CPU 20 of the digital still camera body 1 through a communication terminal mounted on a mount portion for the digital still camera body 1.

The image sensor 10 has an arrangement like the one shown in FIG. 2. FIG. 2 is a view taken in the direction of an arrow C in FIG. 1. The image sensor 10 is placed at a prospective imaging plane of the photographing lens 5. One pixel of the image sensor 10 is constituted by two photoelectric conversion elements 13α and 13β. The photoelectric conversion elements 13α and 13β are designed to receive light beams transmitted through different positions on the pupil of the photographing lens 5 through a microlens 11 formed on the photographing lens side of each photoelectric conversion element.

In this case, the photoelectric conversion element 13α mainly receives a light beam transmitted through the upper side of the photographing lens 5 in FIG. 2, whereas the photoelectric conversion element 13β mainly receives a light beam transmitted through the lower side of the pupil of the photographing lens 5 in FIG. 2.

Figure 3:
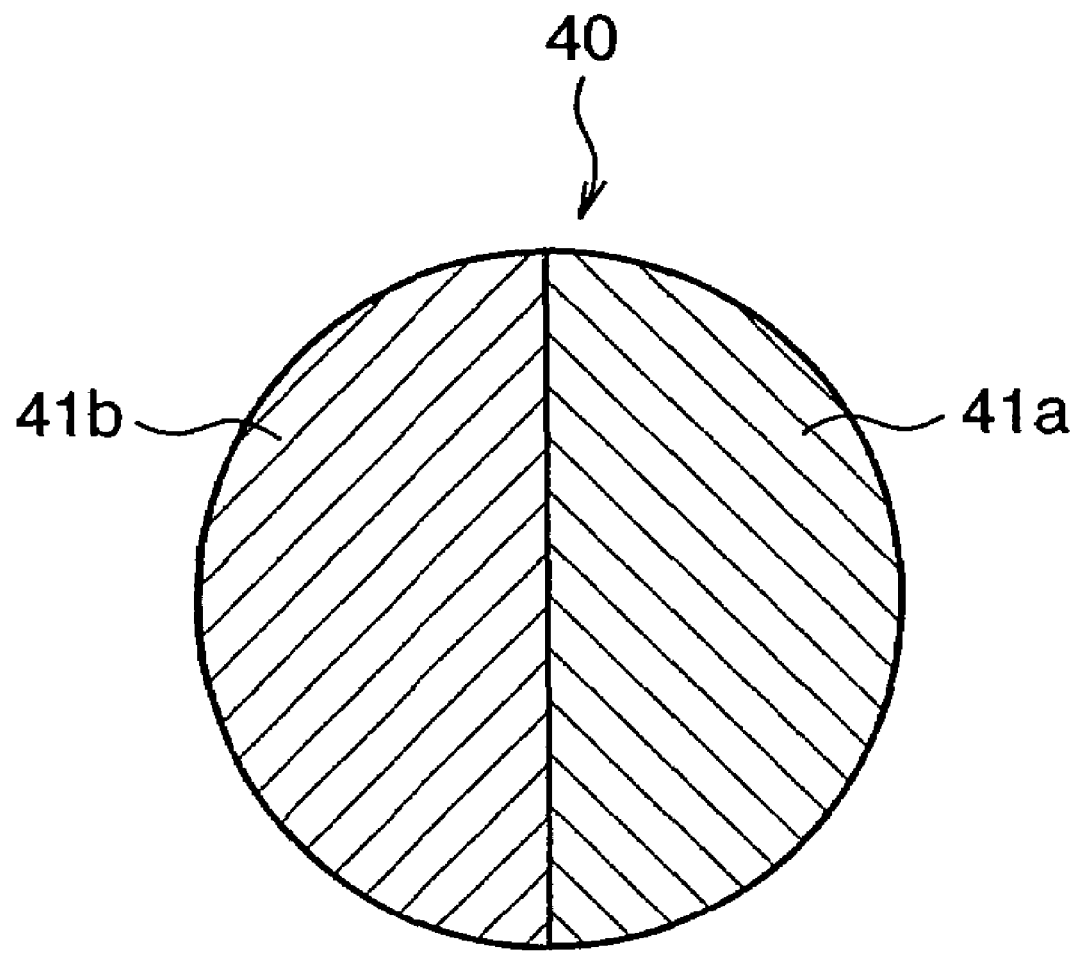
FIG. 3 is a view showing the pupil of the photographing lens.

FIG. 3 is a view showing a pupil 40 of the photographing lens when viewed from the image sensor 10. A light beam to be received by the photoelectric conversion element 13α passes trough a given pupil area 41a of the photographing lens, whereas a light beam to be received by the photoelectric conversion element 13β passes through an area 41b different from the pupil area 41a. In focus detection, outputs from the respective photoelectric conversion elements are read, and an image signal based on light beams transmitted through different pupil positions on the photographing lens is generated from outputs from a plurality of pixels. Letting an A image signal be an image signal based on a light beam passing through the pupil area 41a, and a B image signal be an image signal based on a light beam passing through the pupil area 41b, focus detection is performed by using the A and B image signals. That is, the image sensor 10 in the focus detection device of this embodiment has both an image sensing function and a focus detection function, and performs image sensing operation by using pixels used for focus detection.

The operation flow of the camera according to this embodiment will be described next with reference to FIG. 15.

When the photographer turns on the main switch of the digital still camera body 1 (not shown in FIG. 1) (S102), the CPU 20 executes focus detection of the photographing lens 5 (S201). In focus detection in step S201, the defocus amount of the photographing lens 5 is calculated, and the driving amount of the photographing lens is calculated by using the obtained defocus amount. On the basis of the driving amount of the photographing lens calculated in focus detection in step S201, the CPU 20 sends a lens driving signal to the photographing lens driving mechanism 26 and drives the photographing lens to set it in an in-focus state (S103). When lens driving in step S103 is complete, the CPU 20 sends an image sensing signal to the image sensor control circuit 21 to make the image sensor 10 perform image sensing operation (S104). The image signal obtained by imaging by the image sensor 10 is A/D-converted by the image sensor control circuit 21 and subjected to image processing in the image processing circuit 24. The image signal having undergone the image processing is sent to the liquid crystal display device driving circuit 25 through the CPU 20 to be displayed on the liquid crystal display device 9 (S105). The photographer can observe the object image displayed on the liquid crystal display device 9 through the eyepiece 3. The CPU 20 also checks the state of the operation switch SW2 for recording the sensed image (S106). If the photographer has not operated the operation switch SW2 (S106), the CPU 20 keeps checking the state of the main switch (S102).

If the photographer presses the operation switch SW2 to photograph an object (S106), the CPU 20 sends an image sensing signal to the image sensor control circuit 21 to perform real image sensing operation using the image sensor 10 (S107).

After the image signal A/D-converted by the image sensor control circuit 21 is subjected to image processing in the image processing circuit 24, the resultant signal is sent to the liquid crystal display device driving circuit 25 to be displayed on the liquid crystal display device 9 (S108).

At the same time, the CPU 20 directly stores the sensed image signal in the memory circuit 22 of the digital still camera body 1 (S109). When the photographing operation is complete and the photographer turns off the main switch (S102), the camera is powered off to shift to a standby state (S110).

FIG. 16 shows an operation flow in a focus detection subroutine (S201).

When focus detection is started, the CPU 20 of the camera body 1 sends an image sensing start signal for focus detection to the image sensor control circuit 21 to make the image sensor 10 perform image sensing operation using a focus detection light beam (S202). With output signals having the same hue, the CPU 20 generates an A image signal using a focus detection light beam transmitted through a given area 41a in the pupil area 40 (FIG. 3) of the photographing lens 5, and also generates a B image signal using a focus detection light beam transmitted through a given area 41b in the pupil area 40 of the photographing lens 5 which is different from the area 41a. The CPU 20 performs shading correction for the A and B image signals generated in the photographing operation (S202) to correct an unbalance caused between the A and B image signals when limitation is imposed by vignetting in the photographing optical system (S301). Correlation computation is performed by using the A and B image signals whose coincidence has been improved by the shading correction (S301), and the defocus amount of the photographing lens 5 is calculated from the offset amount between the two image signals (S203). The driving amount of the photographing lens is calculated (S204) on the basis of the defocus amount calculated by the defocus amount calculation (S203). When the driving amount of the photographing lens is calculated (S204), the CPU 20 returns to the main routine (S205).

FIG. 17 shows an operation flow in the shading correction subroutine (S301) in the first embodiment.

Figure 7A:
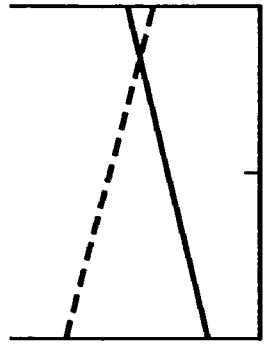
FIGS. 7A to 7F are graphs showing the A and B image signals ((a) on axis, (b) on axis, and (c) out of axis) obtained from an object with uniform luminance, and the A and B image signals ((a) on axis, (b) on axis, and (c) out of axis) obtained from a general object.

When shading correction (S301) is started, the CPU 20 of the camera body 1 loads information unique to the photographing lens from the photographing lens memory circuit 31 (S302). This information unique to the photographing lens includes the F-number information of the photographing lens, the photographing lens exit window position, the exit window radius, and the like. The CPU 20 then loads the focus detection area determined by a focus detection area input means, line-of-sight input means, or the like (S303). On the basis of the lens information and focus detection area obtained by lens information loading (S302) and focus detection area loading (S303), the CPU 20 calculates the intensity ratio produced between the A and B image signals because of the limitation imposed by vignetting in the photographing optical system (S304). The CPU 20 generates shading data (S306) on the basis of the intensity ratio between the A and B image signals, which is obtained by intensity ratio calculation (S304). The shading data are equivalent to the A and B image signals which should be obtained when image sensing operation (S202) for focus detection is performed with respect to an object with uniform luminance. Shading correction (S301) is performed to correct the A and B image signals obtained with respect to the object with uniform luminance such that outputs from the A and B image signals are made uniform in all the pixels in the focus detection area as shown in FIG. 7A. The CPU 20 therefore corrects (S307) the A and B image signals obtained by image sensing operation for focus detection (S202) on the basis of the shading waveforms obtained by shading waveform forming operation (S306), and returns to the focus detection subroutine (S308).

Figure 4:
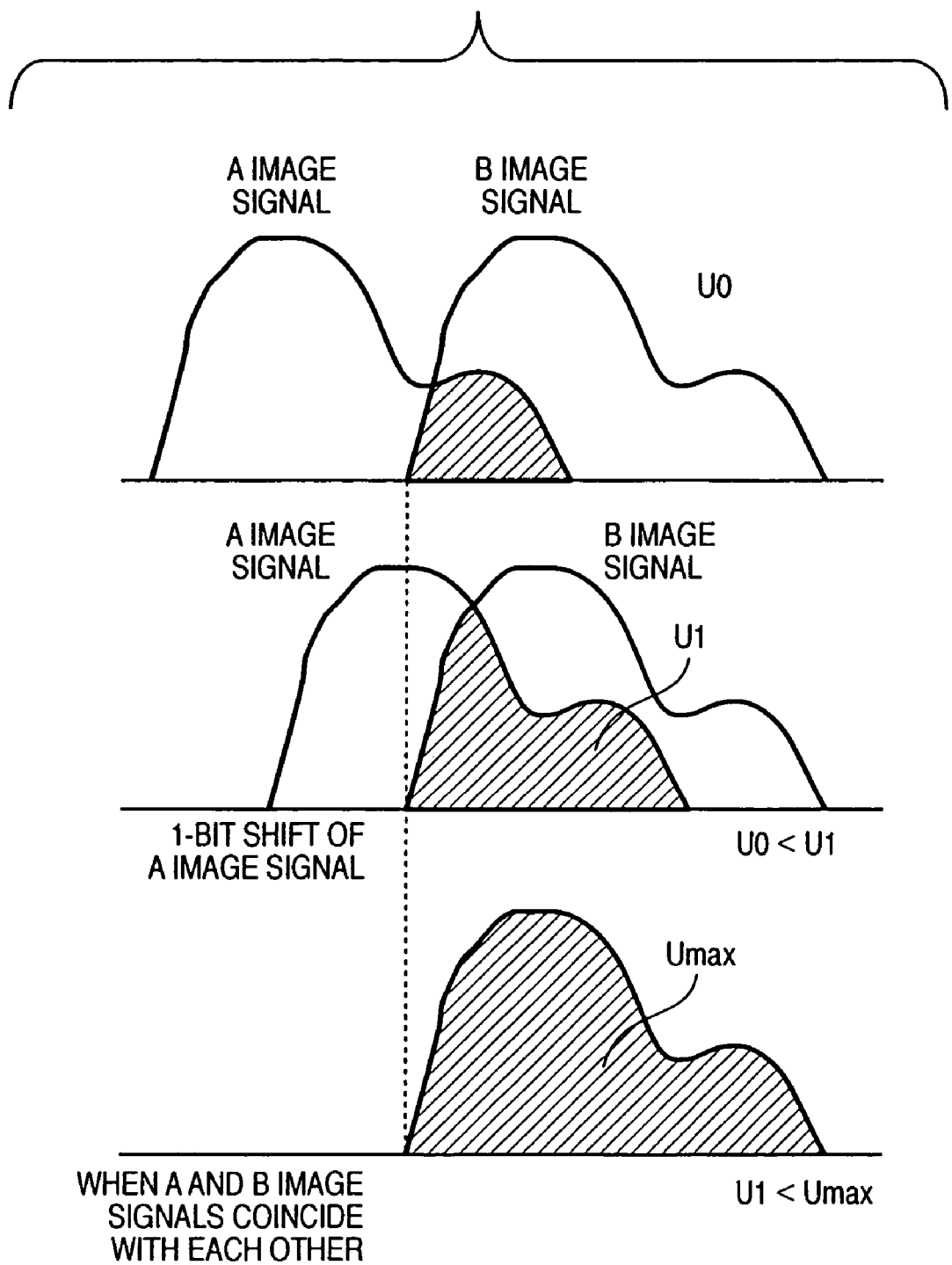
FIG. 4 is a graph for explaining correlation computation processing.

Correlation computation processing in defocus amount calculation (S203) will be described. Assume that two image signals like the A and B image signals shown in FIG. 4 are obtained after shading correction (S301). In this case, the phase difference between the two generated image signals changes depending on the imaging state (in-focus state, near-focus state, or far-focus state) of the photographing lens. When the photographing lens is in the in-focus state, the phase difference between the two image signals disappears. In the near-focus state and far-focus state, a phase difference occurs in different directions. In addition, there is a predetermined relationship between the phase difference between the two image signals and the defocus amount of the photographing lens. In this case, the defocus amount is equivalent to the distance between the position of an object image formed on the photographing lens and the upper surface of a microlens. The defocus amount of the photographing lens is obtained from the phase difference between the two image signals, and a lens driving amount that sets the photographing lens in the in-focus state is calculated, thereby performing focus detection.

The phase difference between the two image signals is obtained by calculating the correlation between the two image signals. The correlation is calculated by the so-called "MIN algorithm". More specifically, letting a[1] to a[n] be the output data of the A image signal, and b[1] to b[n] be the output data of the B image signal, a correlation amount U0 is given by $$U0 = \sum_{j=1}^{v} \min(A[j], B[j]) \quad (1)$$

where min(a, b) represents the smaller value of a and b. First of all, U0 is calculated. As shown in FIG. 4, the CPU 20 then calculates a correlation amount U1 between the data obtained by shifting the signal voltage of the A image signal by one bit and the data of the B image signal as follows:

$$U1 = \sum_{j=1}^{n} \min(A[j+1], B[j]) \quad (2)$$

In this manner, correlation amounts are sequentially calculated while the signal voltage is shifted bit by bit. When the two image signals coincide with each other, the correlation amount takes a maximum value. Therefore, a shift amount corresponding to this maximum value is obtained, and the true maximum value of the correlation amount is obtained from data before and after the maximum value by interpolation. The corresponding shift amount is then set as the phase difference between the two image signals. The defocus amount of the photographing lens is obtained from the phase difference between the two image signals to calculate a lens driving amount that sets the photographing lens in the in-focus state, thereby performing focus detection.

The shading correction subroutine (S301) will be described next.

Assume that the pupil area (to be referred to as an AF pupil area 40 hereinafter) of the image sensor 10 is larger than the pupil area of the photographing optical system or the center of a focus detection area differs from the intersection of the optical axis of the photographing lens and the image sensor 10. In such a case, light beams used for focus detection may be limited by vignetting in the photographing optical system to cause unbalance between the A and B image signals. If there is unbalance between the A and B image signals, the coincidence between the two image signals decreases in correlation computation performed in defocus amount calculation (S203). As a result, the calculated phase difference contains an error. In addition, an increase in unbalance between the A and B image signals may make it impossible to perform correlation computation itself. It is therefore an object of the shading correction subroutine (S301) to correct the unbalance between the A and B image signals used for this focus detection.

Figure 5:
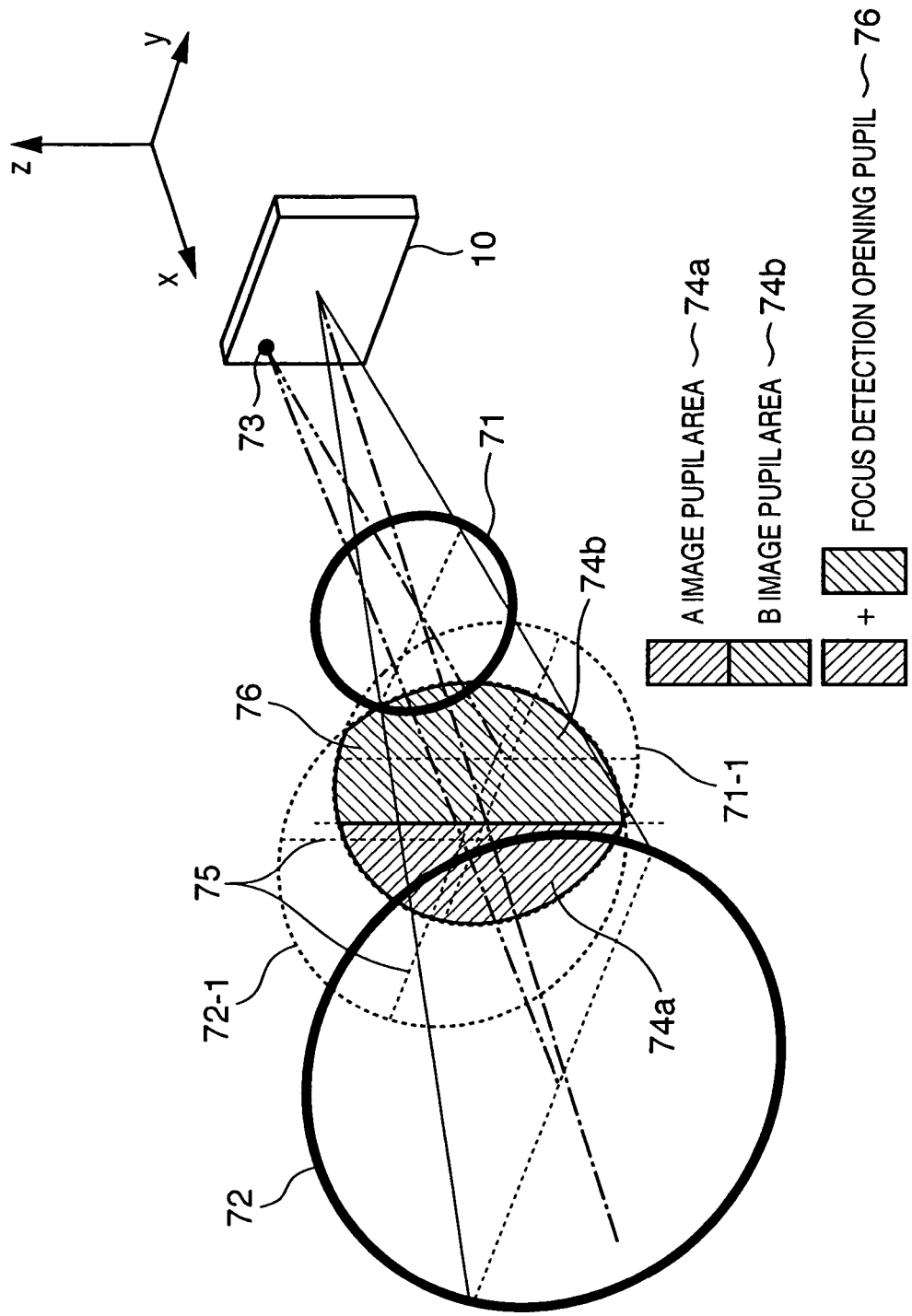
FIG. 5 is a perspective view showing how a focus detection opening pupil is formed by the exit windows of the photographing lens.

FIG. 5 shows how light beams used for focus detection are limited by vignetting in the photographing optical system. The photographing lens 5 is actually comprised of a plurality of lenses. A pixel 73 (to be referred to as a neighboring pixel 73) located outside the intersection of the optical axis of the photographing lens and the image sensor 10 corresponds to a light beam which is limited by the lens holding frame of the lens nearest to the image sensor 10 and the lens holding frame of the lens nearest to the object. The perspective view of FIG. 5 shows how the focus detection light beam received by the neighboring pixel 73 is limited by exit window 1 (71 in FIG. 5) of the photographing lens and exit window 2 (72 in FIG. 5) of the photographing lens which are the lens holding frame of the lens nearest to the image sensor 10 and the lens holding frame of the lens nearest to the object, respectively. Referring to FIG. 5, the optical axis of the photographing lens is defined as the x direction, the long side direction of the image sensor 10, as the y direction, and the short side direction of the image sensor 10, as the z direction.

A projection exit window 71-1 is obtained by projecting exit window 1 from the neighboring pixel 73 onto the AF pupil area 40. A projection exit window 72-1 is obtained by projecting exit window 2 from the neighboring pixel 73 onto the AF pupil area 40. The neighboring pixel 73 receives a light beam passing through a focus detection opening pupil 76 defined by the projection exit window 71-1 and projection exit window 72-1. As shown in FIG. 2, the neighboring pixel 73 is constituted by the two photoelectric conversion elements 13α and 13β. The photoelectric conversion elements 13α and 13β are designed to receive light beams transmitted through different positions on the pupil of the photographing lens 5 through a microlens 11 formed on the photographing lens side of each photoelectric conversion element.

The microlens 11 for the neighboring pixel 73 is located at a position shifted from the two photoelectric conversion elements 13α and 13β in the axial direction such that the boundary line between an area 74a (to be referred to as an A image pupil area 74a hereinafter) through which a light beam to be received by the photoelectric conversion element 13α passes and an area 74b (to be referred to as a B image pupil area 74b hereinafter) through which a light beam to be received by the photoelectric conversion element 13β passes will pass through the optical axis of the photographing lens. For this reason, the waveforms of the A image pupil area 74a and B image pupil area 74b are not symmetrical with respect to the boundary line, and their areas also differ from each other. Since the area of each pupil area determines the spread of a light beam to be received, the light beams received by the photoelectric conversion elements 13α and 13β of the neighboring pixel 73 also differ in intensity. If, therefore, pixels including the neighboring pixel 73 are arrayed in the dividing direction of the photoelectric conversion elements, the A and B image signals obtained from the focus detection area have an intensity difference.

If there is such unbalance between the A and B image signals, the coincidence between the two image signals in correlation computation in defocus amount calculation (S203) decreases to result in an error in the calculated phase difference. Furthermore, an increase in unbalance between the A and B image signals may make it impossible to perform correlation computation itself.

Figures 6A, 6B:
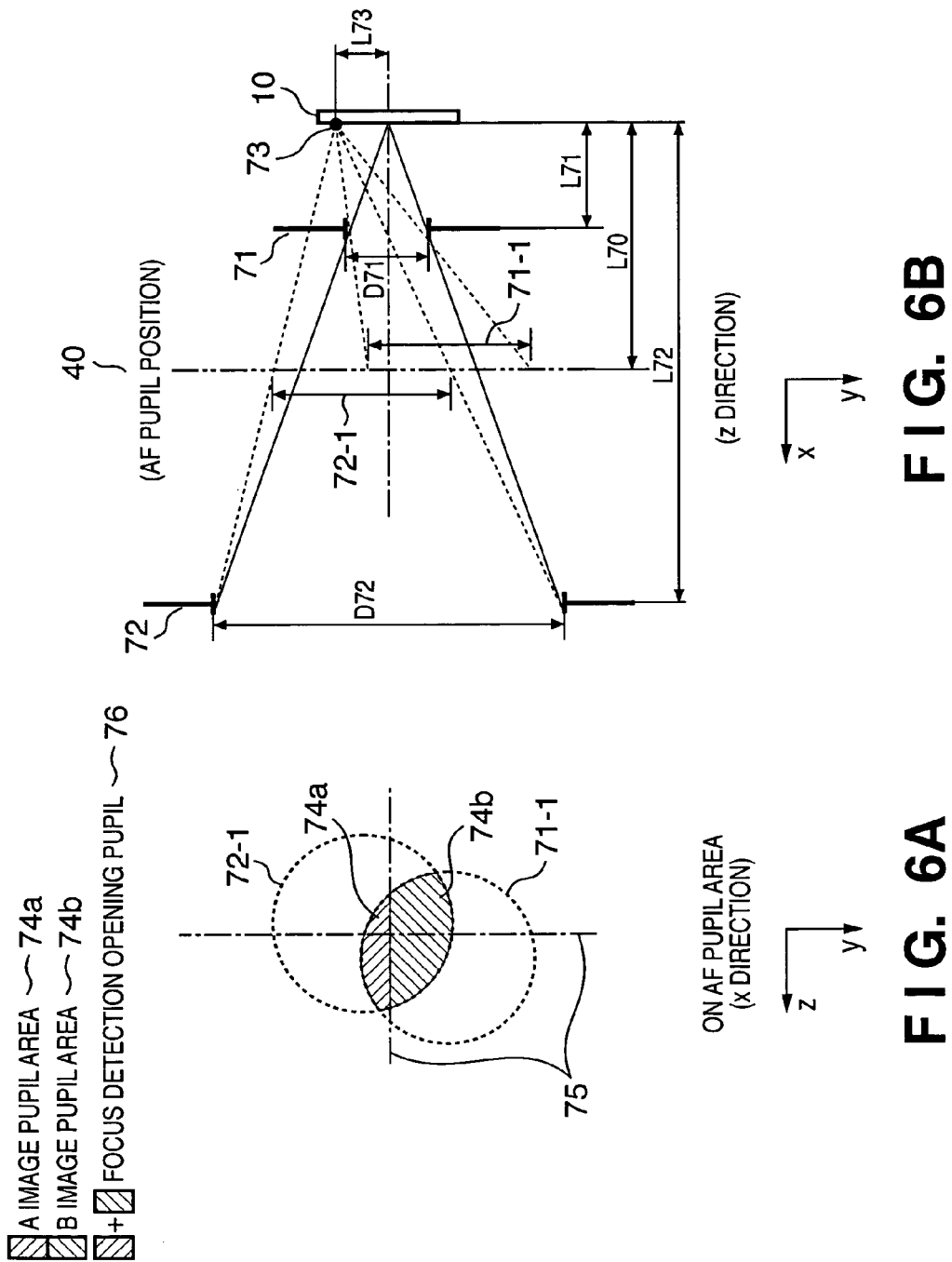
FIGS. 6A and 6B are views showing how a focus detection opening pupil is formed by the exit windows of the photographing lens.

FIG. 6A shows an AF pupil area viewed from the x direction in FIG. 5. FIG. 6B is a view taken in the z direction in FIG. 5. Referring to FIG. 6A, the projection exit window 71-1 is obtained by projecting exit window 1 from the neighboring pixel 73 onto the AF pupil area 40. The projection exit window 72-1 is obtained by projecting exit window 2 from the neighboring pixel 73 onto the AF pupil area 40. The intersection of chain lines 75 corresponds to the optical axis of the photographing lens. A portion of the AF pupil area is defined by the projection exit window 71-1 and projection exit window 72-1 to form the focus detection opening pupil 76. The microlens 11 for the neighboring pixel 73 is located at a position shifted from the photoelectric conversion elements 13α and 13α in the axial direction, and the boundary line between the A image pupil area 74a and the B image pupil area 74b passes through the optical axis of the photographing lens. The A image pupil area 74a and B image pupil area 74b differ in area.

Referring to FIG. 6B, reference numeral 71 denotes exit window 1; and 72, exit window 2. Reference symbol L71 denotes the distance from the image sensor 10 to exit window 1 ( 71); L72, the distance from the image sensor 10 to exit window 2 (72); D71, the diameter of exit window 1 (71); and D72, the diameter of exit window 2 (72). The projection exit window 71-1 is obtained by projecting exit window 1 from the neighboring pixel 73 onto the AF pupil area 40. The projection exit window 72-1 is obtained by projecting exit window 2 from the neighboring pixel 73 onto the AF pupil area 40. The neighboring pixel 73 receives a light beam passing through the focus detection opening pupil 76 defined by the projection exit window 71-1 and projection exit window 72-1. The microlens 11 for the neighboring pixel 73 is placed at a position shifted from the photoelectric conversion elements 13α and 13β in the optical axis direction such that the boundary line between the A image pupil area 74a and the B image pupil area 74b passes through the optical axis of the photographing lens at the AF pupil position 40.

As described above, light beams for defocus amount are limited by the exit windows of the photographing lens, and unbalance occurs between the A and B image signals. FIG. 7A shows the A and B image signals obtained with respect to an object with uniform luminance when no vignetting occurs in any pixel in the focus detection area because the AF pupil area 40 is sufficiently smaller than the pupil of the photographing lens 5, and the center of the focus detection area is located near the optical axis. Since the focus detection area is near the optical axis, a decrease in marginal ray amount in the photographing lens has almost no influence, and both the A and B image signals have given constant values. When, therefore, a given object is image-sensed, the obtained A and B image signals have waveforms like those shown in FIG. 7D.

Figure 7B:
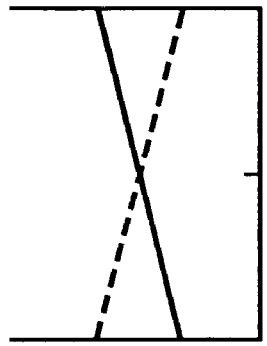

If, however, an AF pupil area is larger than the pupil of the photographing lens, vignetting occurs in pixels other than a pixel on axis because of the exit windows of the photographing lens like those described above. Even if, therefore, the focus detection area is located near the optical axis, the obtained A and B image signals have inclinations as shown in FIG. 7B. The A and B image signals are inclined in opposite directions for the following reason. In an on-axis pixel, no vignetting is caused by the exit windows of the photographing lens, and hence the A and B image signals have the same output. In an out-of-axis pixel, however, vignetting is caused by the exit windows of the photographing lens, and the A image pupil area 74a and B image pupil area 74b differ in area, resulting in an intensity difference. In a pixel located on the photoelectric conversion element 13α side (+y direction) with respect to the optical axis, the A image pupil area is larger in area than the B image pupil area. In a pixel located on the photoelectric conversion element 13β side (−y direction) with respect to the optical axis, the B image pupil area is larger in area than the A image pupil area. For this reason, the obtained A and B image signals have inclinations in opposite directions, and have waveforms crossing each other at an on-axis pixel. For this reason, when the same object as that in the case shown in FIG. 7D is image-sensed, the A image signal decreases in output level toward the right pixel, and the B image signal decreases in output level toward the left pixel, as shown in FIG. 7E. That is, the A and B image signals have different waveforms. As a consequence, the coincidence between the A and B image signals in correlation computation performed in defocus amount calculation (S203) decreases, and an error occurs in the calculated phase difference.

Figure 7C:
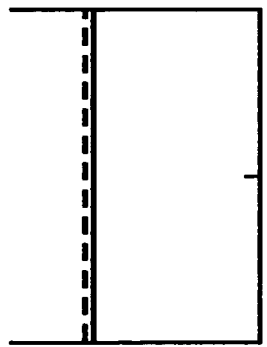
Figure 7D:
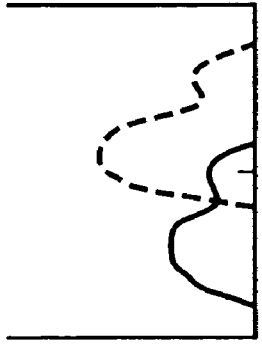
Figure 7E:
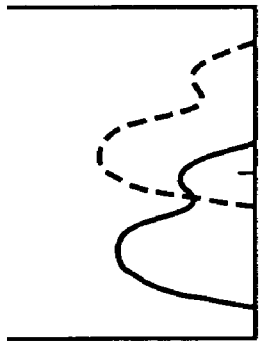
Figure 7F:
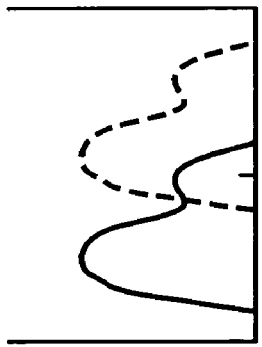

FIG. 7C shows the A and B image signals obtained with respect to an object with uniform luminance when the center of a focus detection area is located far from the optical axis. In such a focus detection area, vignetting is caused in even a pixel near the center of the focus detection area by the exit windows of the photographing lens, and hence the A image pupil area 74a and B image pupil area 74b differ in area, resulting in an intensity difference. If a pixel near the center of the focus detection area exists on the photoelectric conversion element 13β side (−y direction) with respect to the optical axis, the B image pupil area is larger in area than the A image pupil area. In this case, a pixel where the A and B image signals become equal in intensity is an out-of-axis pixel. That is, the obtained A and B image signals have inclinations and an intensity difference. For this reason, even if the same object as that in the case shown in FIG. 7D is image-sensed, the A image signal decreases in output level toward the right pixel, and the B image signal decreases in output level toward the left pixel, as shown in FIG. 7F. Furthermore, the output level of the overall A image signal itself decreases. That is, the A and B image signals have different waveforms. As a consequence, the coincidence between the A and B image signals in correlation computation performed in defocus amount calculation (S203) decreases to result in an error in the calculated phase difference.

Shading correction is therefore performed to correct the unbalance between the A and B image signals. In shading correction, the inclinations of the A and B image signals and their intensity difference like those shown in FIGS. 7B and 7C are corrected by using photographing lens exit window information and focus detection area information.

Figure 8A:
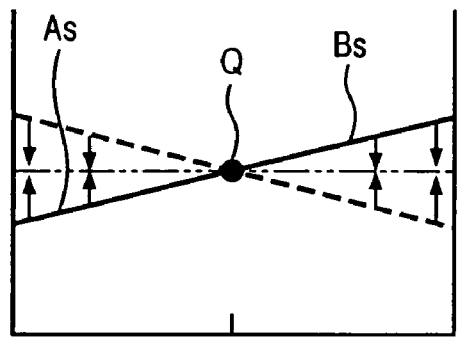
FIGS. 8A to 8D are graphs showing how shading correction (on axis) is performed.
Figure 8B:
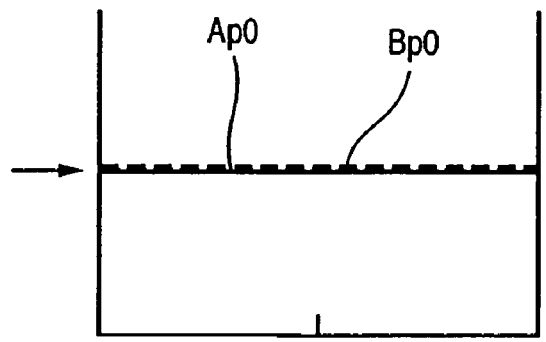
Figure 8C:
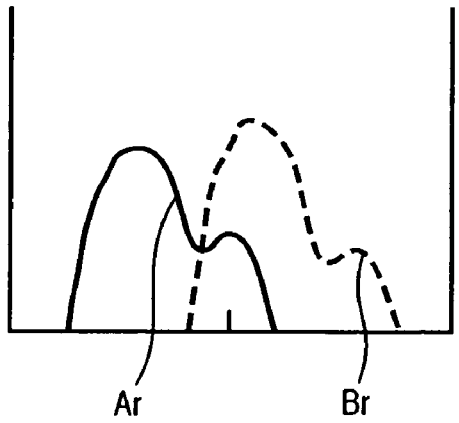

FIGS. 8A to 8D show how shading correction is performed for the waveforms shown in FIG. 7E. A and B image signals (shading data) expected to be obtained with respect to an object with uniform luminance are calculated by using photographing lens exit window positions, exit window diameters, and focus detection area information (FIG. 8A). A weighting factor is calculated for each pixel in the focus detection area such that the A and B image signals in FIG. 8A have given constant values. Letting Q be the output value at the intersection of an A image signal approximation line and a B image approximation line obtained by linear approximation of the A and B image signals, As[1] to As[n] be the calculated output data of the A image signal, and Bs[1] to Bs[n] be the output data of the B image signal, weighting factors Pa[1] to Pa[n] for the A image signal and weighting factors Pb[1] to Pb[n] for the B image signal are expressed as $$Pa[i] = \frac{Q}{As[i]} \quad i = 1 \sim n \quad (3)$$

$$Pb[i] = \frac{Q}{Bs[i]} \quad i = 1 \sim n \quad (4)$$

Figure 8D:
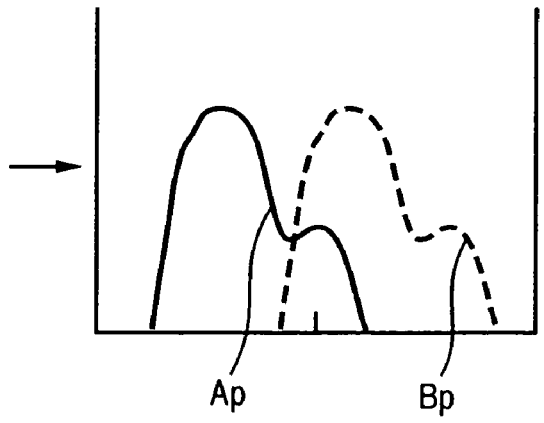
Figure 9A:
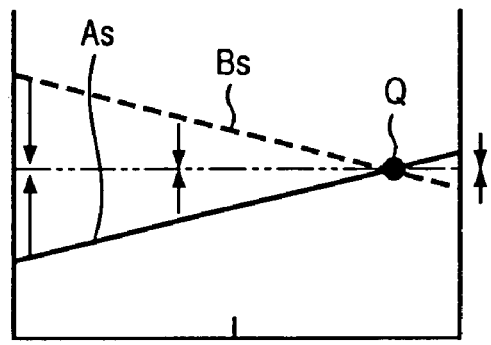
FIGS. 9A to 9D are graphs showing how shading correction (out of axis) is performed.
Figure 9B:
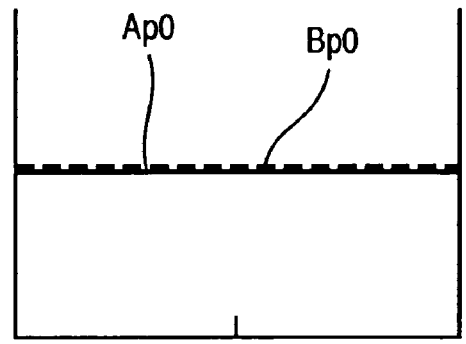
Figure 9C:
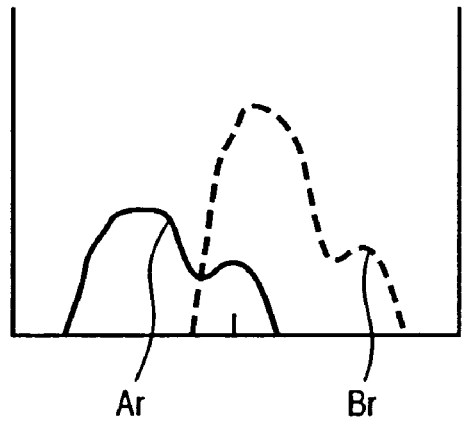
Figure 9D:
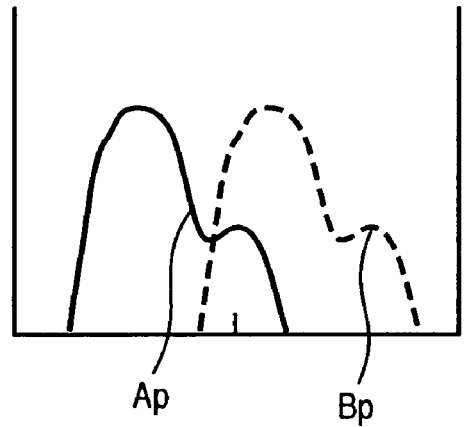

The A and B image signals after correction are obtained by multiplying the respective pixels of the actually obtained A and B image signals (FIG. 8C) by the obtained weighting factors (FIG. 8D). Letting Ar[1] to Ar[n] be the output data of the actually obtained A image signal, and Br[1] to Br[n] be the output data of the B image signal, the output data Ap[1] to Ap[n] of the A image signal after shading correction and the output data Bp[1] to Bp[n] of the B image signal after shading correction are expressed as $$Ap[i]=Pa[i]\cdot Ar[i] \quad (5) \; i=1\sim n$$

$$Bp[i]=Pb[i]\cdot Br[i] \quad (6) \; i=1\sim n$$

Letting Ap0[1] to Ap0[n] and Bp0[1] to Bp0[n] be the data of the A and B image signals which are obtained with respect to an object with uniform luminance after shading correction, the A and B image signals at each pixel become equal in output level, and the intensity difference is corrected, as indicated by:

$$Ap0[i]=Bp0[i] \quad (7) \; i=1\sim n$$

FIGS. 9A to 9D show how shading correction is performed for a waveform like the one shown in FIG. 7F. In the case shown in FIGS. 9A to 9D as well, shading correction is performed by the same method as described above. The A and B image signals obtained with respect to an object with uniform luminance after shading correction become equal in output level, thus correcting the intensity difference.

Obtaining shading data on the basis of photographing lens exit window information and focus detection area information in the above manner makes it possible to correct unbalance caused between the A and B image signals. This in turn improves the coincidence between the two image signals in correlation computation performed in defocus amount calculation (S203), thus improving the precision of the calculated phase difference.

According to the prior art, when a focus detection area is located far from the optical axis and there is unbalance between the A and B image signals, the F-number focus detection light beams must be increased to reduce the influence of vignetting due to vignetting in the photographing optical system. That is, the F-number for focus detection light beams is limited by the position of a focus detection area. In this embodiment, however, by correcting unbalance between the A and B image signals on the basis of shading data, the limitation on the F-number can be eliminated.

In the first embodiment, the shading data As[1] to As[n] and Bs[1] to Bs[n] calculated by using the exit window information of the photographing lens and the focus detection area information are obtained from an intensity ratio r between the A and B image signals. In order to realize a reduction in the cost of the focus detection device and high-speed focus detection, it is required to reduce the computation load for the calculation of shading data. A characteristic feature of the first embodiment is therefore that the intensity ratio r between the A and B image signals used for shading data is simply obtained by a linear expression with parameters determined from photographing lens exit window information and focus detection area information.

The calculation of the intensity ratio r between the A and B image signals which is used to calculate shading data will be described first.

Figure 10:
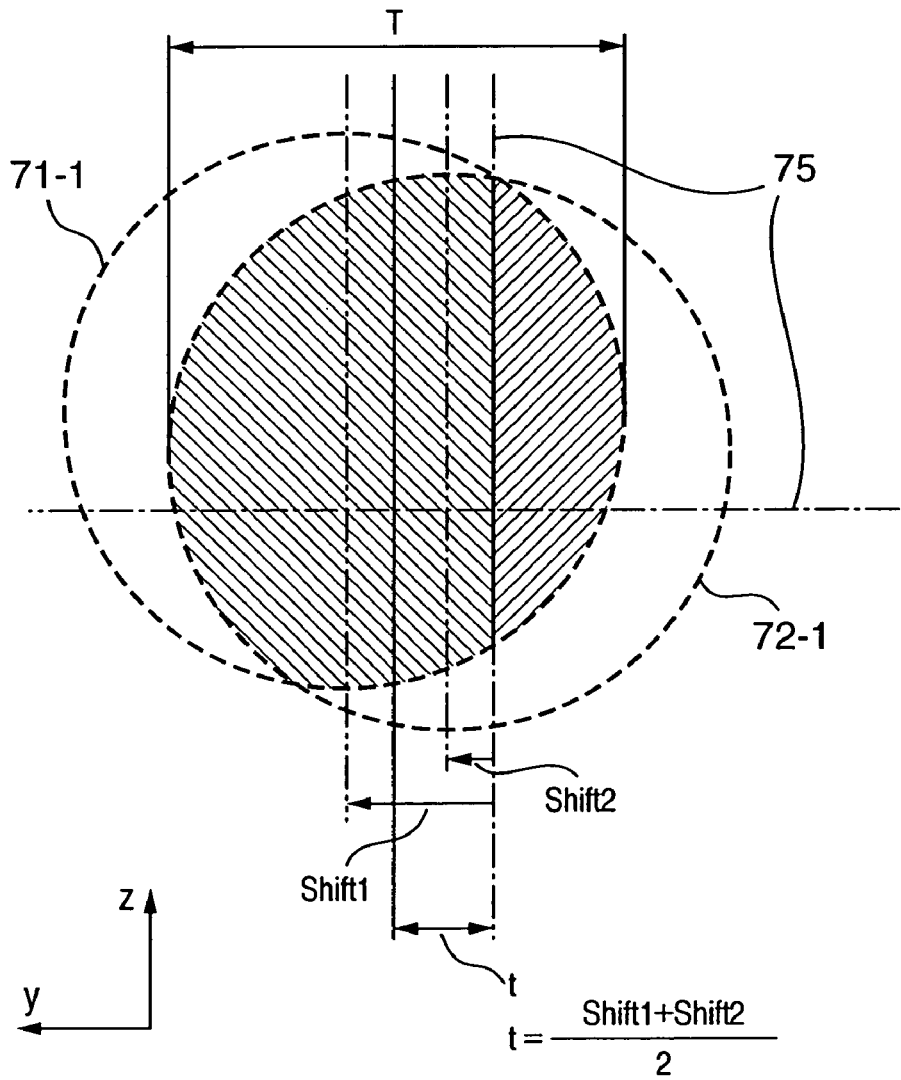
FIG. 10 is a view showing a parameter t/T for the calculation of an intensity ratio r.

FIG. 10 shows the AF pupil area 40 viewed from the x direction in FIG. 5. The intersection of the chain lines 75 corresponds to the optical axis of the photographing lens. The projection exit window 71-1 is obtained by projecting exit window 1 from the neighboring pixel 73 onto the AF pupil area 40. The projection exit window 72-1 is obtained by projecting exit window from the neighboring pixel 73 onto the AF pupil area 40. The AF pupil area 40 is defined by the projection exit window 71-1 and projection exit window 72-1 to form the focus detection opening pupil 76.

Since the boundary line between the A image pupil area 74a and the B image pupil area 74b passes through the optical axis of the photographing lens, the A image pupil area 74a and B image pupil area 74b differ in area. The intensity difference between the A and B image signals is determined by their area ratio. This area ratio almost coincides with the position of the boundary line between the A image pupil area 74a and the B image pupil area 74b in the focus detection opening pupil 76 defined in this manner. Letting Shift1 be the shift amount of the projection exit window 71-1 with respect to the optical axis, Shift2 be the shift amount of the projection exit window 72-1 with respect to the optical axis, and t be the shift amount of the center of the focus detection opening pupil 76 with respect to the optical axis, the shift amount t can be given by $$Shift1 = L73 \cdot \frac{L70}{L71} \quad (8)$$

$$Shift2 = L73 \cdot \frac{L70}{L72} \quad (9)$$

$$t = \frac{Shift1 + Shift2}{2} \quad (10)$$

A diameter D71_1 of the projection exit window 71-1 and a diameter 72_2 of the projection exit window 72-1 are then obtained on the basis of FIG. 6B.

$$D71\_1 = D71 \cdot \frac{L70}{L71} \quad (11)$$

-continued $$D72\_1 = D72 \cdot \frac{L70}{L72} \quad (12)$$

A width T of the focus detection opening pupil 76 in FIG. 10 is then expressed as $$T = \left(\frac{D71\_1}{2} - \text{Shift1}\right) + \left(\frac{D72\_1}{2} + \text{Shift2}\right) \quad (13)$$

Figure 11:
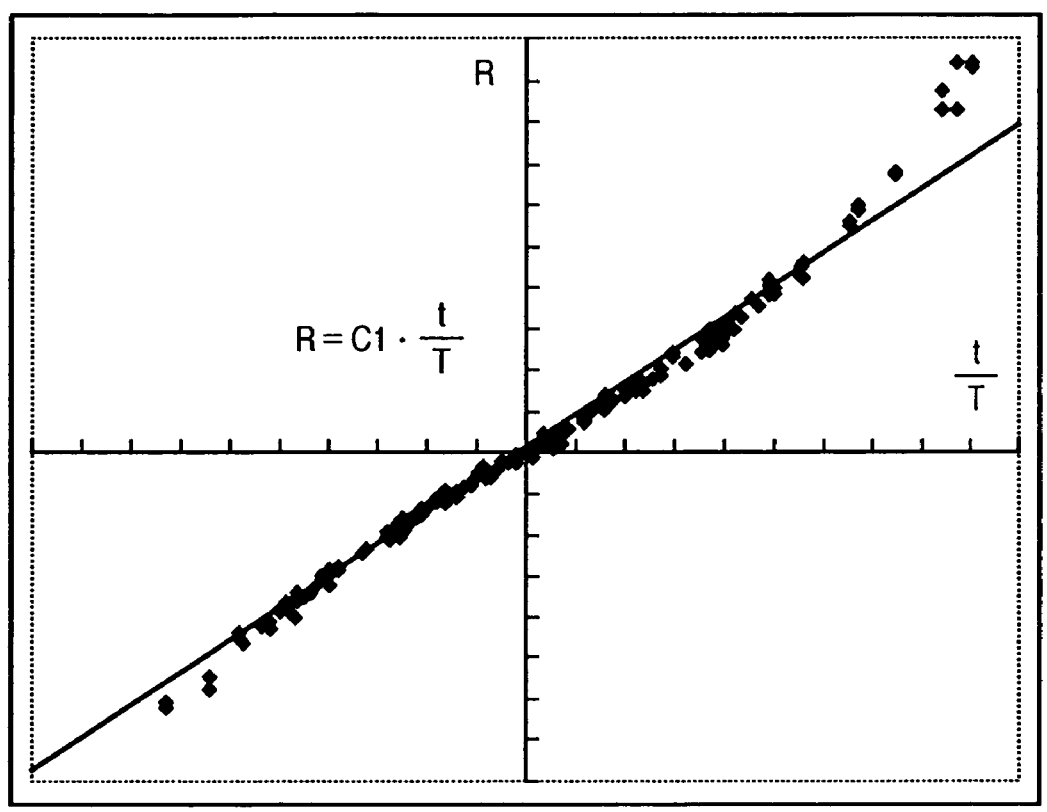
FIG. 11 is a graph showing the relationship between the parameter t/T and a log r of the intensity ratio.

A parameter t/T expressed by t and T obtained by equations (10) and (13) almost coincides with the position of the boundary line between the A image pupil area 74a and the B image pupil area 74b in the defined focus detection opening pupil 76. FIG. 11 is a graph obtained by plotting t/T obtained from a combination of pieces of photographing lens exit window information and a plurality of positions of the neighboring pixel 73 and a log r of the intensity ratio r between the A and B image signals. The abscissa represents t/T; and the ordinate, r. The relationship between t/T and r can be expressed by a linear expression:

$$R = C1 \cdot \frac{t}{T} \quad (14)$$

Obviously, the log r of the intensity ratio r can be simply calculated by a linear expression of t/T. The coefficient C1 is stored in the memory circuit 22 of the digital still camera body 1 in advance. The CPU 20 loads this coefficient from the memory circuit 22 when calculating the log r of the intensity ratio.

According to the prior art, when the intensity ratio r between the A and B image signals is to be expressed by a polynomial for the distance L from the optical axis to the neighboring pixel 73, the degree of the polynomial increases to increase the calculation amount, resulting in a heavy computation load. In this embodiment, however, since the intensity ratio r between the A and B image signals can be simply obtained by a linear expression with the parameter t/T obtained from photographing lens exit window information and focus detection area information, the computation load is light. Therefore, sufficiently fast focus detection can be realized by a device incorporating a computer with a low processing speed.

Shading data is calculated from the calculated intensity ratio r between the A and B image signals. The intensity ratios r between the A and B image signals are calculated in three pixels, i.e., pixels located on the two ends of the focus detection area and in its center, and are set as r121, r122, and r123. The intensity ratios r between the A and B image signals are calculated in at least two pixels.

In each pixel in which the intensity ratio r between the A and B image signals is calculated, A and B image signal outputs are calculated. Letting Ad121, Ad122, and Ad123 be the A image signal outputs in the pixels in which the intensity ratios r between the A and B image signals are calculated, and Bd121, Bd122, and Bd123 be the B image signal outputs, the A and B image signal outputs are obtained as follows from the intensity ratios r between the A and B image signals:

$$Ad121 = \frac{1}{1+r121} \quad (17)$$

$$Ad122 = \frac{1}{1+r122} \quad (18)$$

$$Ad123 = \frac{1}{1+r123} \quad (19)$$

$$Bd121 = \frac{r121}{1+r121} \quad (20)$$

$$Bd122 = \frac{r122}{1+r122} \quad (21)$$

$$Bd123 = \frac{r123}{1+r123} \quad (22)$$

Figure 12:
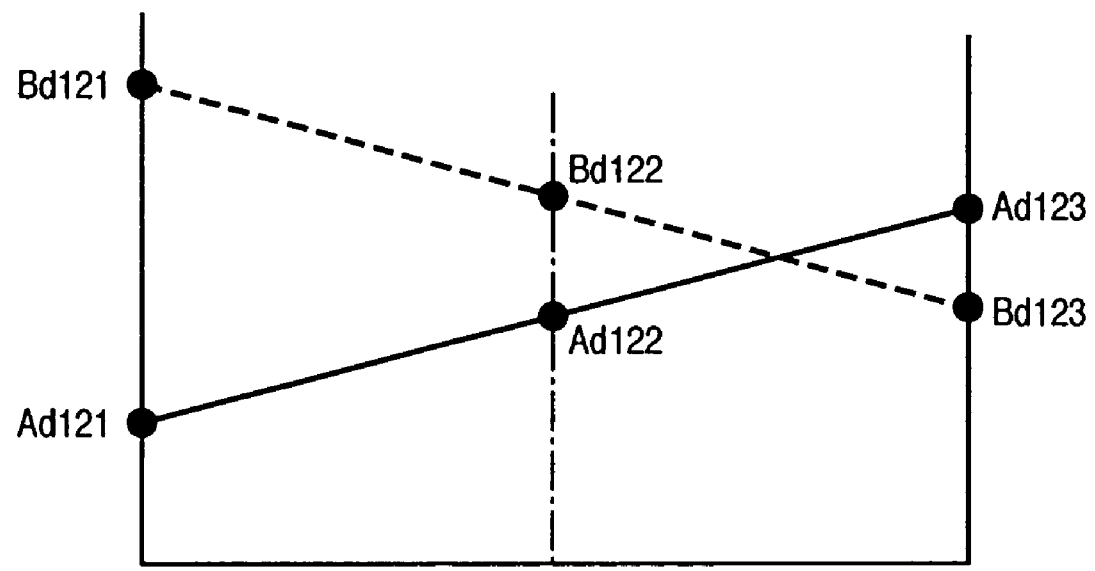
FIG. 12 is a graph showing how shading data is calculated from an A image signal intensity distribution and B image signal intensity distribution.

By linearly approximating the outputs Ad121, Ad122, and Ad123, and the outputs Bd121, Bd122, and Bd123 as shown in FIG. 12, the A image signal shading data As[1] to As[n] and B image signal shading-data Bs[1] to Bs[n] are obtained.

In the prior art, when a focus detection area is located far from the optical axis, and there is unbalance between the A and B image signals, the F-number for focus detection light beams must be increased to reduce the influence of vignetting in the photographing optical system. That is, the F-number for focus detection light beams is limited by the position of a focus detection area. In this embodiment, however, the limitation imposed on the F-number can be eliminated by correcting the unbalance between the A and B image signals on the basis of the above shading data.

The second embodiment proposes a method of obtaining shading data, which is calculated in the first embodiment, with higher precision.

In the second embodiment, shading data As[1] to As[n] and Bs[1] to Bs[n] are obtained from two parameters, i.e., the intensity ratio between the A and B image signals which is calculated by using photographing lens exit window information and focus detection area information and the intensity distribution of the A and B image signals in a focus detection area. In order to realize a reduction in the cost of the focus detection device and high-speed focus detection, it is required to calculate shading data with a light computation load. A characteristic feature of the second embodiment is therefore that the intensity ratio between the A and B image signals and their intensity distribution which are used for shading data are simply obtained by a linear expression with the parameter determined by photographing lens exit window information and focus detection area information.

FIG. 18 shows an operation flow in a shading correction subroutine (S301) in the second embodiment. When shading correction (S301) is started, a CPU 20 of a camera body 1 loads information unique to the photographing lens (S302). The information unique to the photographing lens includes the F-number information of the photographing lens, photographing lens exit window information, exit window radii, and the like. The CPU 20 then loads the focus detection area determined by a focus detection area input means, line-of-sight input means, or the like (S303). The CPU 20 calculates the intensity ratio produced between the A and B image signals because of the limitation imposed by vignetting in the photographing optical system on the basis of the lens information and focus detection area obtained by the loading of the lens information (S302) and the loading of the focus detection area (S303). The CPU 20 also calculates (S305) changes in the intensity ratio between the A and B image signals, i.e., an intensity distribution, which are caused between pixels in the focus detection area by the limitation imposed by vignetting in the photographing optical system on the basis of the lens information and focus detection area obtained by the loading of the lens information (S302) and the loading of the focus detection area (S303). In the intensity distribution calculation (S305), the CPU 20 calculates only the intensity distribution of one of the A and B image signals. The CPU 20 generates shading data (S306) on the basis of the intensity ratio between the A and B image signals and the intensity distribution obtained in the intensity ratio calculation (S304) and intensity distribution calculation (S305). This shading data is equivalent to the A and B image signals to be obtained when image sensing operation (S202) for focus detection is performed with respect to an object with uniform luminance. The shading correction (S301) aims to make the A and B image signals obtained with respect to the object with uniform luminance have uniform output levels in all the pixels in the focus detection area as shown in FIG. 7A. For this purpose, the A and B image signals obtained in the image sensing operation for focus detection (S202) are corrected (S307) on the basis of the shading waveforms obtained in the shading waveform generation (S306). The flow then returns to the focus detection subroutine (S308).

The intensity ratio between the A and B image signals is calculated by the same method as that in the first embodiment. As shown in FIG. 10, letting t be the shift amount of the center of a focus detection opening pupil 76 with respect to the optical axis, and T be the width of the focus detection opening pupil 76, the intensity ratio between the A and B image signals can be simply obtained by a linear expression with a parameter t/T obtained from the photographing lens exit window information and focus detection area information.

$$R = C1 \cdot \frac{t}{T} \quad (14)$$

The coefficient C1 is stored in a memory circuit 22 of the digital still camera body 1 in advance. The CPU 20 loads this coefficient from the memory circuit 22 when calculating a log r of an intensity ratio.

According to the prior art, when the intensity ratio between the A and B image signals is to be expressed by a polynomial for a distance L from the optical axis to a neighboring pixel 73, the degree of the polynomial increases to increase the calculation amount, resulting in a heavy computation load. In this embodiment, however, since the intensity ratio between the A and B image signals can be simply obtained by a linear expression with the parameter t/T obtained from photographing lens exit window information and focus detection area information, the computation load is light. Therefore, sufficiently fast focus detection can be realized by a device incorporating a computer with a low processing speed.

The calculation of the intensity distribution of the A and B image signals which is used to calculate shading data will be described next. In intensity distribution calculation with respect to the A and B image signals, the intensity distribution of one of the A and B image signals is obtained. An intensity distribution may be obtained from the A image signal or B image signal; either will do. Assume that in this case, the intensity distribution of the A image signal is obtained.

Figure 13:
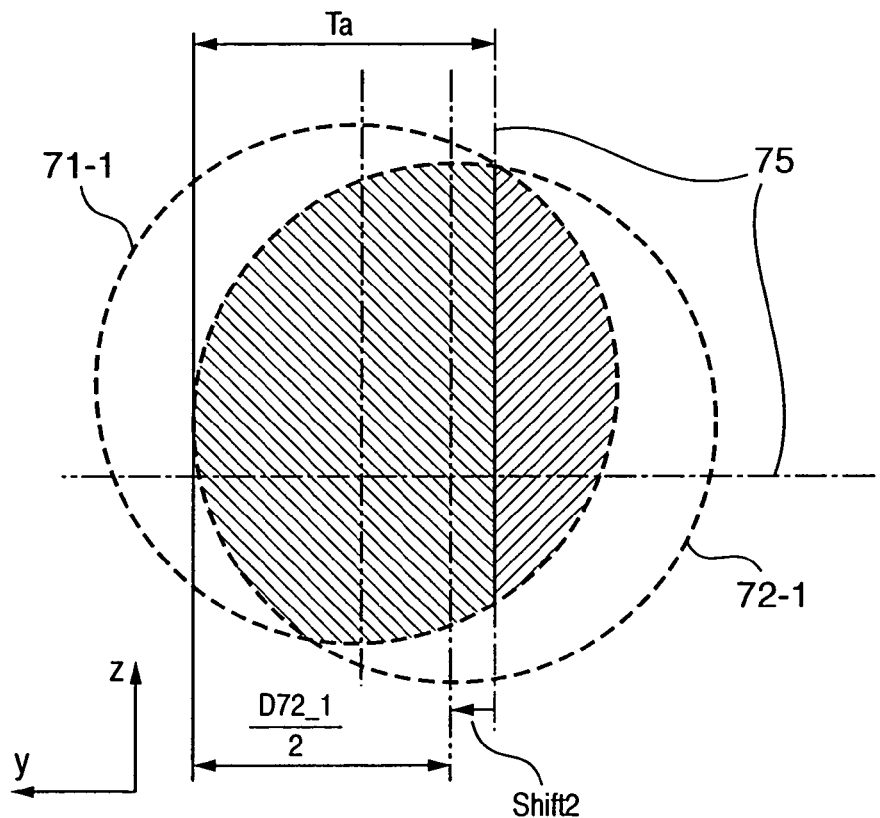
FIG. 13 is a view showing a parameter Ta for the calculation of an A image output Ar.

FIG. 13 shows an AF pupil area 40 viewed from the x direction in FIG. 5. The intersection of chain lines 75 corresponds to the optical axis of the photographing lens. A projection exit window 71-1 is obtained by projecting exit window 1 from the neighboring pixel 73 onto the AF pupil area 40. A projection exit window 72-1 is obtained by projecting exit window 2 from the neighboring pixel 73 onto the AF pupil area 40. A portion of the AF pupil area is defined by the projection exit window 71-1 and projection exit window 72-1 to form the focus detection opening pupil 76.

The boundary line between an A image pupil area 74a and a B image pupil area 74b passes through the optical axis of the photographing lens. The intensity distribution of the A image signal is proportional to the area of the A image pupil area 74a. The area of the A image pupil area 74a is almost proportional to a width Ta of the A image pupil area 74a. Ta is given by $$Ta = Shift2 + \frac{D72\_1}{2} \quad (23)$$

FIG. 14 is a graph obtained by plotting Ta obtained from a combination of pieces of photographing lens exit window information and a plurality of positions of the neighboring pixel 73 and an A image signal output Ar of the neighboring pixel 73 which is obtained with respect to an object with uniform luminance. The abscissa represents Ta; and the ordinate, the A image signal output Ar. The relationship between Ta and Ar can be expressed by a linear expression:

$$Ar = C2 \cdot Ta \quad (24)$$

Obviously, the A image signal output Ar can be simply calculated by a linear expression of Ta. The coefficient C2 is stored in the memory circuit 22 of the digital still camera body 1 in advance. The CPU 20 loads this coefficient from the memory circuit 22 when calculating the A image signal output Ar.

FIG. 12 shows the process of calculating the A image signal intensity distribution by using the A image signal output calculated from the above value Ta. As shown in FIG. 12, A image signal outputs are calculated in three pixels respectively located on the two ends of the focus detection area and in its center and are set as Ad121, Ad122, and Ad123. A image signal outputs are calculated in at least two pixels. The outputs Ad121, Ad122, and Ad123 are set as the intensity distributions of the A image signals According to the prior art, when the intensity distribution of the A image signal is to be expressed by a polynomial for a distance L from the optical axis to the neighboring pixel 73, the degree of the polynomial increases to increase the calculation amount, resulting in a heavy computation load. In this embodiment, however, since the intensity distribution of the A image signal can be simply obtained by a linear expression with the parameter Ta obtained from photographing lens exit window information and focus detection area information, the computation load is light. Therefore, sufficiently fast focus detection can be realized by a device incorporating a computer with a low processing speed.

Shading data is calculated from the intensity ratio between the A and B image signals and the intensity distribution of the A image signal described above. In the respective pixels where the A image signal intensity distributions are calculated, the intensity ratios r between the A and B image signals are calculated and set as r121, r122, and r123. In this calculation method, as described above, the parameter t/T is calculated from the photographing lens exit window information and the position of the neighboring pixel 73, and the intensity ratio r between the A and B image signals is obtained according to equation (14). B image signal outputs Bd121, Bd122, and Bd123 in the pixels where the A image signal intensity distributions are calculated are obtained from the A image signal intensity distributions Ad121, Ad122, and Ad123 and the intensity ratios r between the A and B image signals as follows:

$$Bd121 = r121 \cdot Ad121 \quad (25)$$

$$Bd122 = r122 \cdot Ad122 \quad (26)$$

$$Bd123 = r123 \cdot Ad123 \quad (27)$$

By linearly approximating the distributions Ad121, Ad122, and Ad123, and the outputs Bd121, Bd122, and Bd123 as shown in FIG. 12, the A image signal shading data As[1] to As[n] and B image signal shading data Bs[1] to Bs[n] are obtained.

In the prior art, when a focus detection area is located far from the optical axis, and there is unbalance between the A and B image signals, the F-number for focus detection light beams must be increased to reduce the influence of vignetting in the photographing optical system. That is, the F-number for focus detection light beams is limited by the position of a focus detection area. In this embodiment, however, the limitation imposed on the F-number can be eliminated by correcting the unbalance between the A and B image signals on the basis of the above shading data.

As described above, according to the above embodiment, in a focus detection device which includes a solid-state image sensing device constituted by the first photoelectric conversion element array which photoelectrically converts the first light beam passing through the first area of the exit pupil of a photographing optical system and the second photoelectric conversion element array which photoelectrically converts the second light beam passing through the second area different from the first area, and detects the focus state of the photographing optical system by computing the correlation between the first image signal which is an image signal from the first photoelectric conversion element array and the second image signal which is an image signal from the second photoelectric conversion element array, the intensity difference between signals from the first and second photoelectric conversion elements is corrected on the basis of the ratio between the shift amount of the focus detection opening pupil formed when the focus detection pupil area is limited by the exit windows of the photographing optical system, and the width of the focus detection opening pupil, thereby obtaining the following effects:

(1) The unbalance caused between the first and second image signals when focus detection light beams are limited by vignetting in the photographing optical system can be efficiently corrected with a small calculation amount.

(2) The F-number for light beams used for distribution is not limited by a focus detection area.

In the focus detection device, the intensity difference caused between signals from the first and second photoelectric conversion elements in each of all the pixels in a predetermined focus detection area is corrected on the basis of the intensity difference between at least two focus detection pixels in the focus detection area, thereby obtaining the following effect.

(3) The unbalance caused between the first and second image signals when focus detection light beams are limited by vignetting in the photographing optical system can be efficiently corrected with a smaller calculation amount.

Other Embodiment

The present invention can be applied to a system constituted by a plurality of devices, or to an apparatus comprising a single device, or to a system designed to perform processing through a network such as a LAN.

The objects of the respective embodiments are also achieved by supplying a storage medium (or a recording medium), which records a program code of software that can realize the functions of the above embodiments to the system or apparatus, and reading out and executing the program code stored in the storage medium by a computer (or a CPU or MPU) of the system or apparatus. In this case, the program code itself read out from the storage medium realizes the functions of the above embodiments, and the storage medium which stores the program code constitutes the present invention. The functions of the above embodiments may be realized not only by executing the readout program code by the computer but also by some or all of actual processing operations executed by an OS(operating system) running on the computer on the basis of an instruction of the program code.

Furthermore, obviously, the functions of the above embodiments can be realized by some or all of actual processing operations executed by a CPU or the like arranged in a function extension card or a function extension unit, which is inserted in or connected to the computer, after the program code read out from the storage medium is written in a memory of the extension card or unit.

When the present invention is to be applied to the above storage medium, program codes corresponding to the sequences described above are stored in the storage medium.

As has been described above, according to the above embodiments, the unbalance caused between the first and second image signals when limitation is imposed by vignetting in the photographing optical system can be efficiently corrected with a small calculation amount.

In addition, the limitation imposed on the F-number for light beams used for focus detection by a focus detection area can be eliminated.

As many apparently widely different embodiments of the present invention can be made without departing from the spirit and scope thereof, it is to be understood that the invention is not limited to the specific embodiments thereof except as defined in the appended claims.

What is clamed is:

1. A focus detection device comprising:
a solid-state image sensing device including a first photoelectric conversion element array which photoelectrically converts a first light beam passing through a first area of an exit pupil of a photographing optical system, and a second photoelectric conversion element array which photoelectrically converts a second light beam passing through a second area of the exit pupil which is different from the first area,
wherein every two photoelectric conversion elements of said first and second photoelectric conversion element arrays include a microlens positioned such that the first light beam passing through the first area of the exit pupil and the second light beam passing through the second area of the exit pupil focuses on a first and a second photoelectric conversion element respectively; and
a computing device which detects a focus state of the photographing optical system by computing a correlation between a first shading-corrected image signal which is an image signal from the first photoelectric conversion element array and a second shading-corrected image signal which is an image signal from the second photoelectric conversion element array in accordance with a position of a focus detection area in an image sensing frame on the basis of a ratio between a shift amount of a focus detection opening pupil from an optical axis, caused by being limited by an exit window of the photographing optical system, and a width of the focus detection opening pupil.

2. The device of claim 1, wherein information utilized to create the shading-corrected image signal is obtained from a digital memory in a photographing lens.

3. A focus detection method comprising:

detecting a first light beam passing through a first area of an exit pupil of a photographing optical system which is photoelectrically converted by a first photoelectric conversion element array, and a second light beam passing through a second area of the exit pupil which is different from the first area which is photoelectrically converted by a second photoelectric conversion element array, wherein every two photoelectric conversion elements of said first and second photoelectric conversion element arrays include a microlens positioned such that the first light beam passing through the first area of the exit pupil and the second light beam passing through the second area of the exit pupil focuses on a first and a second photoelectric conversion element respectively; and calculating a focus state of the photographing optical system by computing a correlation between a first shading-corrected image signal which is an image signal from the first photoelectric conversion element array and a second shading-corrected image signal which is an image signal from the second photoelectric conversion element array in accordance with a position of a focus detection area in an image sensing frame on the basis of a ratio between a shift amount of a focus detection opening pupil, formed when limitation is imposed by an exit window of the photographing optical system, with respect to an optical axis, and a width of the focus detection opening pupil.

4. A computer program recorded on a computer-readable medium for causing a computer to execute the focus detection method recited in claim 3.

* * * * *